(12) United States Patent
Park

(10) Patent No.: US 9,063,275 B2
(45) Date of Patent: Jun. 23, 2015

(54) VOICE COIL MOTOR

(75) Inventor: Sangok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 112 days.

(21) Appl. No.: 13/241,729

(22) Filed: Sep. 23, 2011

(65) Prior Publication Data
US 2012/0206824 A1    Aug. 16, 2012

(30) Foreign Application Priority Data

Feb. 14, 2011  (KR) .................. 10-2011-0012934

(51) Int. Cl.
| | |
|---|---|
| *G02B 7/02* | (2006.01) |
| *G03B 3/10* | (2006.01) |
| *G03B 13/34* | (2006.01) |
| *H02K 41/03* | (2006.01) |
| *G02B 7/08* | (2006.01) |
| *H02K 41/035* | (2006.01) |

(52) U.S. Cl.
CPC .............. *G02B 7/08* (2013.01); *H02K 41/0356* (2013.01)

(58) Field of Classification Search
CPC ........... H01L 2224/45144; H01L 2924/00014; H01L 2224/48091; H01L 2224/85205; H01L 2924/00; H01L 2224/78301; H01L 2224/786; H01L 2224/851; H01L 2224/85181; H01L 24/45; H01L 24/78; H01L 24/85
USPC ................ 359/811, 813, 822–825, 819, 814; 396/133, 529
See application file for complete search history.

(56) References Cited

U.S. PATENT DOCUMENTS

| | | | |
|---|---|---|---|
| 7,113,351 B2 * | 9/2006 | Hovanky | 359/824 |
| 2011/0291495 A1 * | 12/2011 | Lee et al. | 310/12.16 |

FOREIGN PATENT DOCUMENTS

| | | | | |
|---|---|---|---|---|
| JP | 2005-128405 | * | 5/2005 | G02B 7/04 |
| JP | 2006-091607 | * | 4/2006 | G02B 7/04 |

* cited by examiner

*Primary Examiner* — Joseph P Martinez
*Assistant Examiner* — Brandi Thomas
(74) *Attorney, Agent, or Firm* — Saliwanchik, Lloyd & Eisenschenk

(57) ABSTRACT

A voice coil motor is disclosed, the motor including: a mover including a lens improved in an optical characteristic of an incident light and a coil block arranged at a periphery of the lens; a stator including a magnet opposite to the coil block of the mover; elastic members respectively coupled to an upper end and a bottom end opposite to the upper end of the lens to elastically support the mover; and a base fixing the mover and the stator.

15 Claims, 3 Drawing Sheets

VOICE COIL MOTOR

CROSS-REFERENCE TO RELATED APPLICATION

This application claims the benefit under 35 U.S.C. §119 of Korean Patent Application No. 10-2011-0012934, filed Feb. 14, 2011, which is hereby incorporated by reference in its entirety.

BACKGROUND OF THE INVENTION

1. Field of the Invention

The present disclosure relates to a voice coil motor.

2. Description of Related Art

Recently, mobile phones and smart phones embedded with a digital camera capable of photographing a digital still image and/or moving pictures have been developed.

In a case of a miniature digital camera used on a conventional mobile phone, it was impossible to adjust a gap between an image sensor changing outside light to a digital image or a digital moving picture and a lens. However, a lens driving device such as a voice coil motor has been recently developed capable of adjusting a gap between the image sensor and the lens enabling to obtain a digital image or a digital moving picture more improved than that of the conventional miniature digital camera.

Generally, a voice coil motor includes a stator, a mover moving relative to the stator and an elastic member elastically supporting the mover, where the mover includes a coil block generating a magnetic field in response to a current, a bobbin functioning to fix the coil block and a lens embedded in the bobbin.

The voice coil motor recently requires a further smaller-sized and yet larger caliber lens.

However, in order to mount the larger caliber lens into a voice coil motor, size of the voice coil motor problematically increases, while a caliber of the lens decreases if the size of the voice coil motor is to be reduced.

BRIEF SUMMARY

The present invention is directed to provide a voice coil motor that is reduced in size but increased in caliber. The present invention is also directed to provide a voice coil motor that is reduced in size, the number of parts, the number of assembling processes and manufacturing cost, but increased in caliber.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a voice coil motor, comprising: a mover including a lens improved in an optical characteristic of an incident light and a coil block arranged at a periphery of the lens; a stator including a magnet opposite to the coil block of the mover; elastic members respectively coupled to an upper end and a bottom end opposite to the upper end of the lens to elastically support the mover; and a base fixing the mover and the stator.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
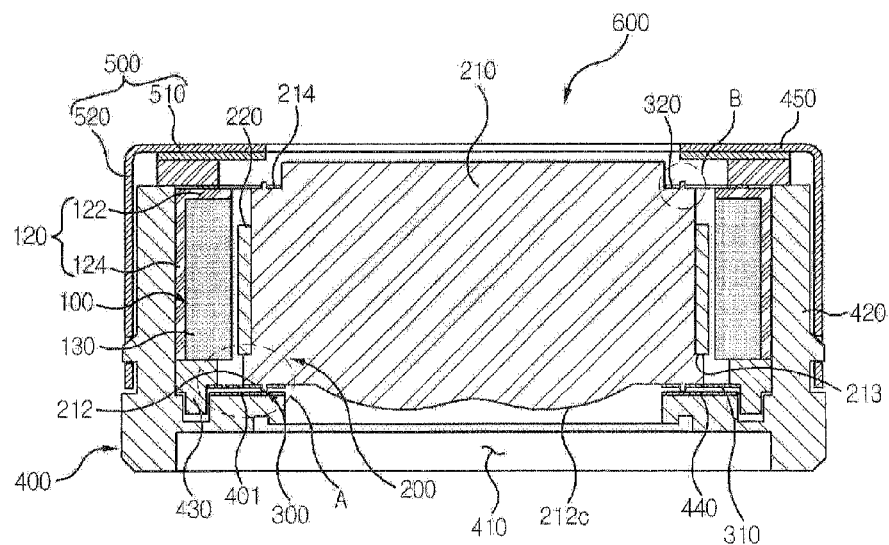
FIG. 1 is a cross-sectional view illustrating a voice coil motor according to an exemplary embodiment of the present disclosure.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

In the drawings, the size and relative sizes of layers and regions may be exaggerated for clarity. Like numbers refer to like elements throughout, and explanations that duplicate one another will be omitted.

Now, the exemplary embodiments of a voice coil motor according to the present disclosure will be explained in detail together with the figures.

Figure 2:
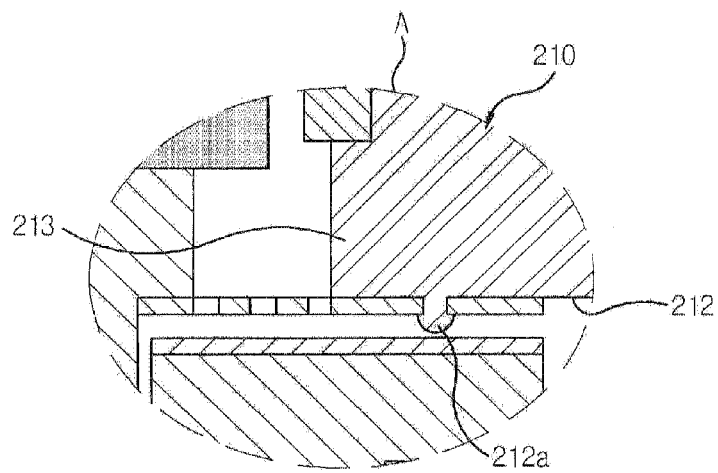
FIG. 2 is a partially enlarged view of "A" portion of FIG. 1.
Figure 3:
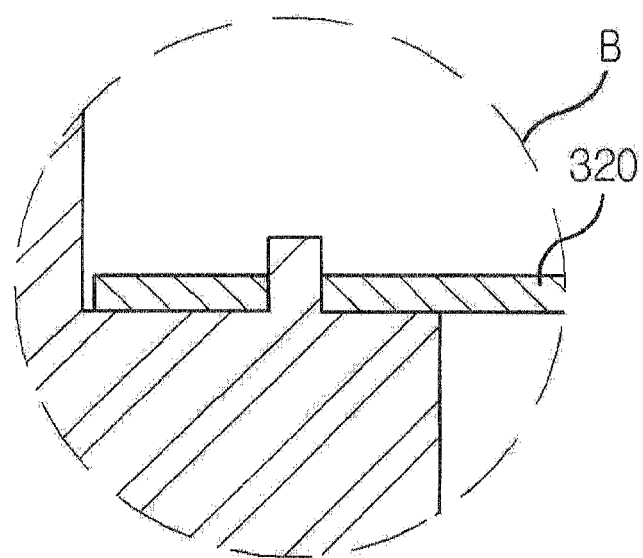
FIG. 3 is a partially enlarged view of "B" portion of FIG. 1.
Figure 4:
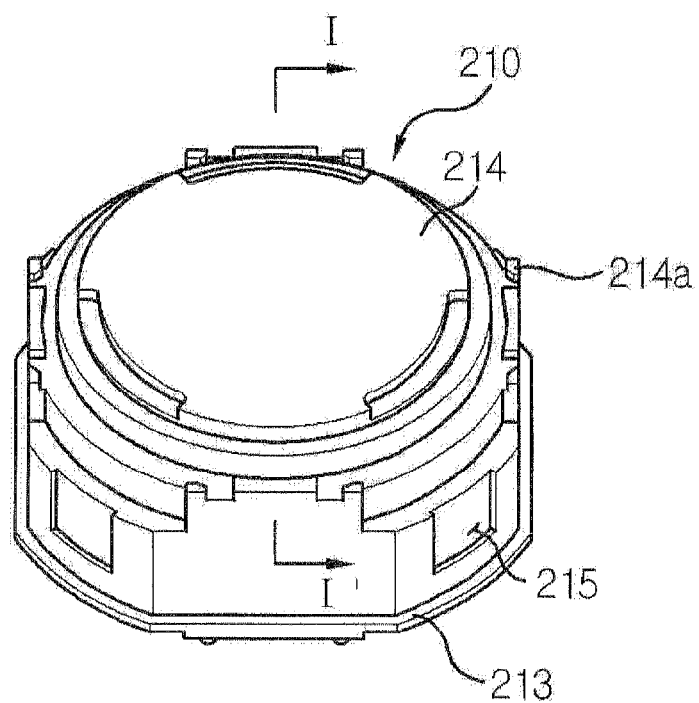
FIG. 4 is a perspective view illustrating a lens of FIG. 1.
Figure 5:
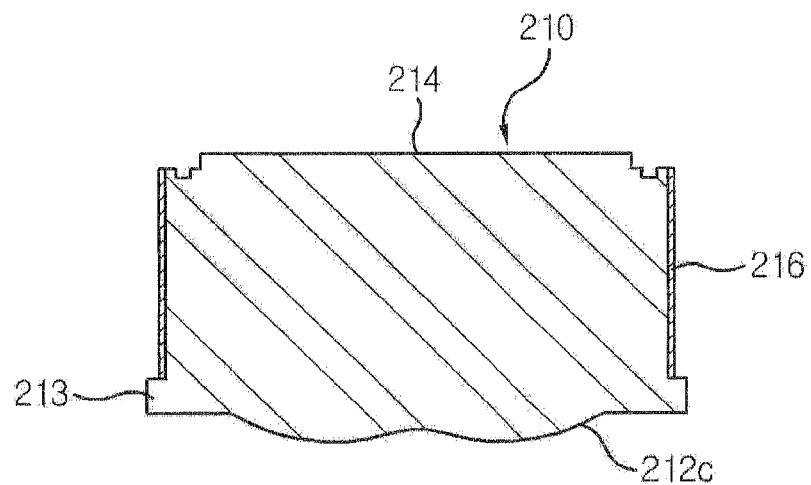
FIG. 5 is a cutaway cross-sectional view along line "1-1" of FIG. 4.
Figure 6:
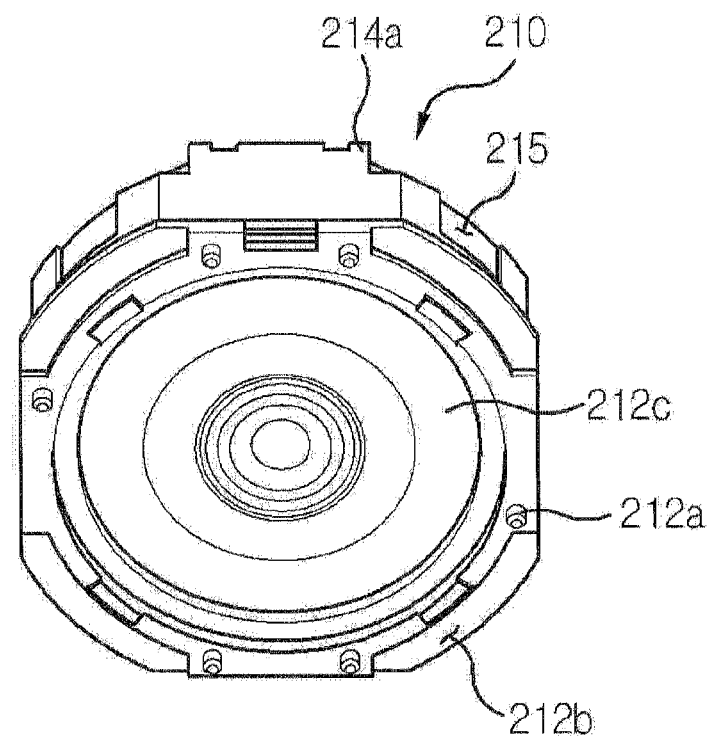
FIG. 6 is a rear perspective view of FIG. 4.

FIG. 1 is a cross-sectional view illustrating a voice coil motor according to an exemplary embodiment of the present disclosure, FIG. 2 is a partially enlarged view of "A" portion of FIG. 1, FIG. 3 is a partially enlarged view of "B" portion of FIG. 1, FIG. 4 is a perspective view illustrating a lens of FIG. 1, FIG. 5 is a cutaway cross-sectional view along line "1-1" of FIG. 4, and FIG. 6 is a rear perspective view of FIG. 4.

Referring to FIGS. 1 to 6, a voice coil motor (600) includes a stator (100), a mover (200), elastic members (300) and a base (400).

In a non-limiting example, the stator (100) includes a yoke (120) and a magnet (130). The stator (100) generates a magnetic field for driving the mover (200, described later). The yoke (120) includes a yoke upper plate (122) and a yoke lateral plate (124). The yoke (120) serves to inhibit the magnetic field generated from the magnet (130, described later) and the mover (200) from leaking, and to enhance a driving efficiency of the mover (200) by allowing a magnetic field not directed toward the mover (200) in the magnetic field generated from the magnet (130) to face the mover, (200).

The yoke upper plate (122), when viewed from a top plane, may take the shape of a square plate, and is centrally formed with an opening for exposing a lens (described later) of the mover (200). The yoke lateral plate (124) is extended from edges of the square plate-shaped yoke upper plate (122), and an accommodating space for accommodating the magnet (130) and the mover (200) is formed by the yoke lateral plate (124) and the yoke upper plate (122).

The magnet (130), formed in plural number, is secured on an inner surface of the yoke lateral plate (124). The plurality of magnets (130) generates a magnet field for driving the mover (200). The mover (200) includes a lens (210) and a coil block (220).

In the exemplary embodiment of the present disclosure, a periphery of the lens (210) at the mover (200) is directly secured to the coil block (220). That is, the mover (200) in the exemplary embodiment of the present disclosure does not include fixing means such as a bobbin for fixing the lens (210) and the coil block (220). Therefore, the voice coil motor (600) can form the lens (210) having a caliber as large as a size of fixing means such as a bobbin.

Furthermore, the voice coil motor (600) can reduce the number of parts, the number of assembling processes and manufacturing cost by directly fixing the coil block (220) using the lens (210) free from fixing means such as the bobbin.

In order to directly secure the coil block (220) to the lens (210), the lens (210) in the exemplary embodiment of the present disclosure may be formed in the shape of a pillar, for example. The lens (210) may take various shapes including a solid pillar, a round pillar, and a polygonal pillar.

The lens (210) in the exemplary embodiment of the present disclosure may include a transparent synthetic resin in which light is incident and emitted, and may be manufactured with a single synthetic resin.

Meanwhile, in a case the lens is manufactured with a transparent synthetic resin in which light is incident and emitted, a lateral surface of the lens (210) may be formed with a light blocking membrane (216) to inhibit light incident into the lens (210) from a lateral surface of the lens (210) or light incident into an incident surface of the lens (210) from leaking to the lateral surface of the lens (210). Furthermore, a bottom surface (212) of the lens (210) may be formed with a convex lens unit (212c) concentrating the light introduced into the incident surface of the lens (210).

Now, referring to FIGS. 2 and 4, a bottom end at an external surface of the lens (210) is formed with a support unit (213) for supporting the coil block (220) to inhibit the coil block (220) from deviating from the lens (210). The support unit (213) may be integrally formed with the lens (210).

Alternatively, the support unit (213) may be formed in the shape of a ring to be attached to the lens (210). In a non-limiting example, the support unit (213) may be formed in a plurality of ring shapes intermittently provided along the bottom surface of the external surface of the lens (210).

Referring to FIGS. 4, 5 and 6, the bottom surface (212) and an upper surface (214) of the lens (210) are respectively formed with coupling lugs (212a, 214a), which in turn are respectively coupled to an elastic member (described later).

Now, the coupling lug (212a) formed at the bottom surface (212) of the lens (210) is defined as a first coupling lug (hereinafter referred to as reference numeral 212a), and the coupling lug (214a) formed at the upper surface (214) of the lens (210) is defined as a second coupling lug (hereinafter referred to as reference numeral 214a). The first and second coupling lugs (212a, 214a) are protruded from the bottom and upper surfaces (212. 214) of the lens (210) and integrally formed with the lens (210).

The first and second coupling lugs (212a, 214a) formed on the bottom and upper surfaces (212, 214) of the lens (210) are inserted into a through hole formed at the elastic member as shown in FIG. 2, and changed in shape by heat, where the elastic member and the first and second coupling lugs (212a, 214a) are thermally fused.

Referring to FIG. 4, a bond tank unit (215) for accommodating an adhesive for fixing the coil block (220) and the lens (210) is formed at a periphery of the lens (210) opposite to the coil block (220) for inhibiting the coil block (220) from deviating from the periphery of the lens (210). It should be apparent that a plurality of bond tank units (215) may be continuously formed on the periphery of the lens (210) each in a shape of a strip.

In the exemplary embodiment of the present disclosure, the adhesive may be filled in between the lens (210) and the coil block (220), or the adhesive may be selectively coated only on the bond tank unit (215) between the lens (210) and the coil block (220).

Referring to FIG. 6 again, in a case the lens (210) functions as fixing means like the bobbin, the bottom surface of the lens (210) may be interfered with the elastic member (described later). In the exemplary embodiment of the present disclosure, a portion of the bottom surface (212) of the lens (210) interfered by the elastic member may be formed with a groove-shaped interference prevention unit (212b) to avoid interference with the elastic member.

The coil block (220) of the mover (200) is secured at the periphery of the lens (210). The coil block (220) may be formed by directly winding a wire insulated by enamel resin to the periphery of the lens (210), or by winding a wire in the shape of a cylinder and forming the wound wire on the periphery of the lens (210) and bonding by using the adhesive accommodated in the bond tank unit (215) formed at the periphery of the lens (210).

The coil block (220) generates a magnetic field by a current applied from outside, and an attractive force or a repulsive force is generated between the mover (200) and the stator (100) by a direction of the current applied to the coil block (220), whereby the mover (200) is driven relative to the stator (100) using the attractive force or the repulsive force, resulting in adjustment of a gap formed by the lens (210) of the mover (200) and an image sensor arranged at the bottom surface of the lens (210).

Referring to FIG. 1 continuously, an elastic member (300) elastically supports the mover (200) including the lens (210) and the coil block (220). The elastic member (300) includes a first elastic member (310) and a second elastic member (320). Two first elastic members (310) are formed, where the two first elastic members (310) are electrically insulated, and each of the first elastic members (310) is thermally fused by the first coupling lug (212a) protruded from the bottom surface (212) of the lens (210). The two first elastic members (310) are respectively and electrically connected to a distal end of one side and to a distal end of the other side of the coil block (220), and application of a driving signal to the two first elastic members (310) causes a magnetic field to be generated from the coil block (220).

A part of the first elastic member (310) is interposed and fixed between a base (described later) and a spacer (described later).

The second elastic member (320) is formed in one solid shape, and inserted into and coupled to the second coupling lug (214a) protruded from the upper surface (214) of the lens (210). A part of the second elastic member (320) is arranged on and fixed to the yoke (120).

The base (400) takes the shape of a plate to fix the mover (200), and is centrally formed with an opening (410) through which light that has passed the lens (210) of the mover (200) passes.

Four corners on an upper surface of the plate-shaped base (400) are respectively formed with coupling pillars (420), which in turn function to couple a cover can (described later) to the base (400).

A rear surface of the base (400) is secured with an image sensor (not shown) that generates an image corresponding to the light that has passed the lens (210) of a bobbin (210, described later) and an infrared (IR) filter (not shown). A frame-shaped spacer (430) is interposed between the base (400) and the magnet (130) of the mover (200). The spacer (430) serves to fix a part of the first elastic member (310) and also to electrically insulate the first elastic member (310) from the magnet (130).

In the exemplary embodiment of the present disclosure, an upper surface of the base (400) and the bottom surface (212) of the lens (210) maintain a predetermined gap (discrete from each other) when a driving signal is not applied to the coil block (220), whereby the lens (210) moves to a first direction approaching the base (400) or to a second direction distancing from the base (400) in response to a direction of a current based on the driving signal applied to the coil block (220).

Although the exemplary embodiment of the present disclosure has illustrated and explained the upper surface of the base (400) and the bottom surface (212) of the lens (210) being discrete from each other when the driving signal is not applied to the coil block (220), it should be alternatively apparent that the bottom surface (212) of the lens (210) is arranged on the upper surface of the base (400) when the driving signal is not applied to the coil block (220), and the bottom surface (212) of the lens (210) is distanced from the upper surface of the base (400) when the driving signal is applied to the coil block (220).

Referring to FIG. 1 again, the voice coil motor (600) may include a cover can (500). The cover can (500) is formed with an opening for exposing the lens (210) of the mover (200), and includes an upper plate (510) in a plate shape corresponding to that of the base (400) and a lateral plate (520) extended to a direction facing the base (400) from an edge of the upper plate (510), where the lateral plate (520) is coupled to a lateral surface of the base (400).

Referring to FIG. 1 once again, the mover (200) according to the exemplary embodiment of the present disclosure may be driven to a direction facing the base (400) and to a direction distancing from the base (400). Therefore, the lens (210) may collide with the base (400) or the upper plate (510) of the cover can (500) when the mover (200) vertically moves, whereby noise may be generated by deformed shapes or collision of the first and second elastic members (310, 320).

In order to inhibit the generation of noise, the voice coil motor (600) may further include a first shock absorption member (440) and a second shock absorption member (450). The first shock absorption member (440) may be formed at an upper surface (401) of the base opposite to the bottom surface (212) of the lens (210), and the second shock absorption member (450) may be arranged on an inner surface of the cover can (500) opposite to the upper surface (214) of the lens (210).

The first and second absorption members (440, 450) may include any one of sponge, a synthetic resin having elasticity and a rubber.

As apparent from the foregoing, the voice coil motor according to the present disclosure has an industrial adaptability in that size, the number of parts, the number of assembling processes and manufacturing cost of the voice coil motor can be reduced, and yet caliber of a lens can be increased by arranging a coil block free from lens fixing means such as a bobbin on a periphery of the lens receiving an outside light and emitting the light to an image sensor.

The above-mentioned voice coil motor according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A voice coil motor comprising:
   a mover including a lens and coil block arranged at a periphery of the lens;
   a stator including a magnet opposite to the coil block of the mover;
   elastic members respectively coupled to an upper portion and a lower portion of the lens, each of the elastic members including a plate spring; and
   a base configured to fix the stator; and
   coupling lugs on the upper portion and the lower portion of the lens, respectively coupling the elastic members;
   wherein a support portion supporting the coil block is protrusively formed at a lower portion of the lens from an external surface of the lens, and
   wherein an interference prevention portion inhibiting the lens from being interfered by the elastic members is disposed in the lens.

2. The voice coil motor of claim 1, wherein each of the elastic members has an opening coupled to the coupling lug.

3. The voice coil motor of claim 1, wherein the coupling lugs are thermally fused to the elastic members.

4. The voice coil motor of claim 1, wherein a convex lens part is formed on a bottom surface adjacent to the base in the lens.

5. The voice coil motor of claim 1, further comprising:
   a bond tank portion configured to accommodate adhesive on the periphery of the lens.

6. The voice coil motor of claim 1, further comprising:
   a light blocking membrane iat the periphery of the lens,the lights blocking membrane configured to inhibit leakage of an incident light or block infusion of the incident light.

7. The voice coil motor of claim 1, wherein a bottom surface of the lens supported by the elastic member is distanced from the base, while a driving signal is not applied to the coil block.

8. The voice coil motor of claim 1, wherein the elastic members comprise:
   a pair of first elastic members coupled to a bottom surface of the lens, the first elastic members separated from each other, and
   a second elastic members coupled to an upper surface opposite to the bottom surface of the lens.

9. The voice coil motor of claim 8, wherein the first elastic members are electrically coupled to both distal ends of the coil block.

10. The voice coil motor of claim 1, wherein the bottom surface of the lens supported by the elastic member is contacted with the base, while a driving signal is not applied to the coil block.

11. The voice coil motor of claim 1, further comprising:
    a base shock absorption member arranged on an upper surface of the base facing the bottom surface of the lens.

12. The voice coil motor of claim 1, further comprising:
a cover can coupled to the base for covering the mover and the stator.

13. The voice coil motor of claim 12, further comprising:
a cover can shock absorption member arranged at an inner lateral surface of the cover can facing the upper surface of the lens.

14. The voice coil motor of claim 1, wherein the stator includes a yoke for securing a magnet.

15. A mobile phone comprising the voice coil motor of claim 1.

* * * * *